United States Patent
Goff et al.

[11] Patent Number: 6,099,329
[45] Date of Patent: Aug. 8, 2000

[54] RETRACTABLE COAXIAL JACK

[75] Inventors: Darrell E. Goff, Layton; Stephen C. Aldous, Salt Lake City, both of Utah

[73] Assignee: 3Com Corporation, Santa Clara, Calif.

[21] Appl. No.: 09/183,835

[22] Filed: Oct. 30, 1998

Related U.S. Application Data

[63] Continuation-in-part of application No. 08/976,819, Nov. 24, 1997, abandoned, which is a continuation-in-part of application No. 08/689,715, Aug. 16, 1996, Pat. No. 5,727,972, which is a continuation of application No. 08/291,277, Aug. 16, 1994, Pat. No. 5,547,401, which is a continuation-in-part of application No. 08/040,656, Mar. 31, 1993, Pat. No. 5,338,210, which is a continuation-in-part of application No. 07/974,253, Nov. 10, 1992, abandoned, which is a division of application No. 07/866,670, Apr. 8, 1992, Pat. No. 5,183,404.

[51] Int. Cl.[7] .................................................. H01R 13/44
[52] U.S. Cl. ......................................... 439/131; 439/316
[58] Field of Search ................................... 439/131, 638, 439/945, 946, 578, 675, 312, 314, 316, 320, 322, 323

[56] References Cited

U.S. PATENT DOCUMENTS

| | | | |
|---|---|---|---|
| 363,568 | 5/1887 | Wightman | 439/675 |
| 879,773 | 2/1908 | Horton | 439/255 |
| 1,504,843 | 8/1924 | Shore | 439/255 |
| 2,877,437 | 3/1959 | Flanagan, Jr. | |
| 3,173,473 | 3/1965 | Loveland | 439/253 |
| 4,138,182 | 2/1979 | Muratsuka | 439/322 |
| 4,836,801 | 6/1989 | Ramirez | 439/322 |
| 5,139,439 | 8/1992 | Shie | 439/359 |
| 5,183,404 | 2/1993 | Aldous et al. | 439/131 |
| 5,411,405 | 5/1995 | McDaniels | 439/131 |
| 5,439,394 | 8/1995 | Ikeda | 439/675 |
| 5,463,261 | 10/1995 | Skarada et al. | 439/131 |
| 5,474,470 | 12/1995 | Hammond, Jr. | 439/675 |
| 5,499,923 | 3/1996 | Archibald | 439/26 |
| 5,505,633 | 4/1996 | Broadbent | 439/329 |
| 5,538,442 | 7/1996 | Okada | 439/676 |
| 5,561,727 | 10/1996 | Akita et al. | 385/88 |
| 5,608,607 | 3/1997 | Dittmer | 361/686 |
| 5,634,802 | 6/1997 | Kerklaan | 439/131 |
| 5,660,568 | 8/1997 | Moshayedi | 439/654 |
| 5,679,013 | 10/1997 | Matsunaga | 439/144 |
| 5,773,332 | 6/1998 | Glad | 439/344 |
| 5,928,009 | 6/1999 | Lee | 439/131 |

FOREIGN PATENT DOCUMENTS

WO 95/13633  5/1995  WIPO.

*Primary Examiner*—Neil Abrams
*Attorney, Agent, or Firm*—Workman, Nydegger & Seeley

[57] ABSTRACT

A retractable coaxial jack (14) includes a base (52) slidably positioned within a PC card (12) or other electrical apparatus. Projecting from the front face (89) of the base (52) is a tubular insulator (90) that encircles a conductive socket (92). The socket (92) bounds an opening (94) for receiving a contact pin (20). Also projecting from the front face (89) of the base (52) on opposing sides of the tubular insulator (90) is a conductive, outwardly extending first arm (95) and a conductive, outwardly extending second arm (96). The separate outwardly extending arms (95, 96) are desirably arranged to create a thinner coaxial jack (14) than conventional types of coaxial jacks to enable the jack to be retracted into the PC card (12). Preferably each of the retention arms (95, 96) has a curved inside face (98), an opposing curved outside face (100) and a knob (102) projecting from the outside face. The outwardly extending arms (95, 96) are desirably spaced from the tubular insulator (90) to form a gap (104). The tubular insulator (90), conductive socket (92) and outwardly extending arms (95, 96) are configured to selectively couple with a conventional coaxial connector such as a bayonet connector or BNC.

22 Claims, 6 Drawing Sheets

RETRACTABLE COAXIAL JACK

This application is a continuation-in-part of application Ser. No. 08/976,819, filed Nov. 24, 1997, now abandoned, which is a continuation-in-part of application Ser. No. 08/689,715 filed Aug. 16, 1996, now U.S. Pat. No. 5,727,972, which is a continuation of Ser. No. 08/291,277, filed Aug. 16, 1994, now U.S. Pat. No. 5,547,401, which is a continuation-in-part of Ser. No. 08/040,656, filed Mar. 31, 1993, now U.S. Pat. No. 5,338,210, which is a continuation-in-part of application Ser. No. 07/974,253 filed Nov. 10, 1992, now abandoned, which is a divisional of application Ser. No. 07/866,670, filed Apr. 8, 1992, now U.S. Pat. No. 5,183,404. Each of these references are incorporated herein by reference in their entireties.

BACKGROUND OF THE INVENTION

1. The Field of the Invention

The present invention relates to coaxial couplers, and more specifically thin coaxial jacks that can be retractably mounted on a PC card or other electrical apparatus.

2. Present State of the Art

Electrical apparatus, such as personal computers and personal information managers (PIMs), are becoming increasingly dependent upon their ability to electrically communicate or share information with other electrical apparatus. To facilitate this communication, many electrical apparatus have been developed with slots for receiving different PC cards. PC cards are small relatively thin cards which house desired electronics for performing functions such as modem operation, extended memory, communicating with network systems, or communicating with cellular telephones. PC cards are required to have a defined form factor or size configuration so as to fit within the designed slot.

Various types of couplers have been developed for electrically connecting an outside electrical line, such as a telephone line or network cable, to a PC card. In one type of coupler, a thin socket is formed on the side of the PC card. The socket is configured to electrically couple with a pin connector commonly referred to as a PC card connector.

One specific type of cable that is used to effect electrical communication between electrical apparatus is coaxial cable. Although coaxial cable comes in different designs, each coaxial cable includes a center conductive cable over which a signal is transferred. A flexible tubular insulator made of a dielectric or non-conductive material encircles the conductive cable. In turn, a flexible conductive sleeve, often in a form of a wire mesh, encircles the insulator. The conductive sleeve functions as a shield or ground to help maintain the integrity of signal in the center conductive cable. Finally, the conductive sleeve is coated with a durable insultative sheath.

Coaxial cables are well integrated and used extensively in many network systems throughout the world. Some of the benefits of coaxial cable are that it is simple, relatively inexpensive, and has standardized couplers for connecting the cable with electrical apparatus. The coupler includes a coaxial connector such as a bayonet connector or BNC which is connected to a corresponding jack. A conventional coaxial connector has a relatively large tubular structure while the jack includes a tubular plug which interlocks with the connector by a type of threaded engagement.

One of the drawbacks to using coaxial cable is that many of the standardized coaxial jacks have a relatively large diameter that is greater than the thickness of most PC cards. As a result, conventional coaxial jacks cannot be mounted on or within a PC card without compromising the standard size restrictions. As a result, various types of adapter have been developed which enable coupling between a coaxial connector and a conventional pin socket formed on PC cards. The required use of such adapters, however, increases cost and complicates the connection. Furthermore, such adapters are often lost or misplaced.

OBJECTS AND BRIEF SUMMARY OF THE INVENTION

Accordingly, it is an object of the present invention to provide improved coaxial couplers.

More specifically, it is an object of the present invention to provide coaxial couplers which include a conventional coaxial connector and an improved coaxial jack for coupling with the coaxial connector.

Another object of the present invention is to provide an improved coaxial jack as above which can be mounted on a PC card, the coaxial jack enabling the coaxial connector to be directly connected to the PC card without the use of an adapter.

Still another object of the present invention is to provide a coaxial jack as above which can be retractably disposed on a PC card.

Finally, another object of the present invention is to provide improved coaxial jacks which are smaller than conventional coaxial jacks and can be retractably mounted on any desired electrical apparatus.

To achieve the foregoing objects, and in accordance with the invention as embodied and broadly described herein, a coaxial jack is provided. The coaxial jack includes a base having a front face. Projecting from the front face of the base it a tubular insulator made from a dielectric material. The tubular insulator encircles a conductive socket which in turn bounds an opening. The opening is configured to receive the contact pin of a conventional coaxial connector. Also projecting from the front face of the base on opposing sides of the insulator is a conductive first retention arm and a conductive second retention arm. Each of the retention arms has a curved inside face and an opposing curved outside face. In one embodiment, each outside face has a knob projecting therefrom. In alternative embodiments, the outside face can be smooth or have threads formed thereon. The retention arms are spaced from the tubular insulator so that a gap is formed therebetween. The retention arms, tubular insulator, and conductive socket are configured to be engaged with a conventional coaxial connector, such as a bayonet connector or BNC, in a conventional way.

The coaxial jack can be slidably disposed within a PC card or other electrical apparatus. In this configuration, the coaxial jack is operable between an extended position and a retracted position. In the extended position, the retention arms, tubular insulator, and conductive socket project from the PC card or other electrical apparatus so that the coaxial connector can freely couple therewith. In the retracted position, the coaxial jack is substantially enclosed within the PC card or other electrical apparatus so as to be protected.

The inventive coaxial jack has a number of unique and beneficial features. Most notably, the coaxial jack can be mounted on a PC card so that a conventional coaxial connector can be directly coupled therewith without the use of a separate adapter. Furthermore, the coaxial jack can be selectively retracted into the PC card so as to enable the PC card to maintain its required form factor. The inventive coaxial jack can further be mounted directly onto an electrical apparatus such as a laptop computer, cellular telephone, or PIM to facilitate direct electrical communication with a coaxial cable.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
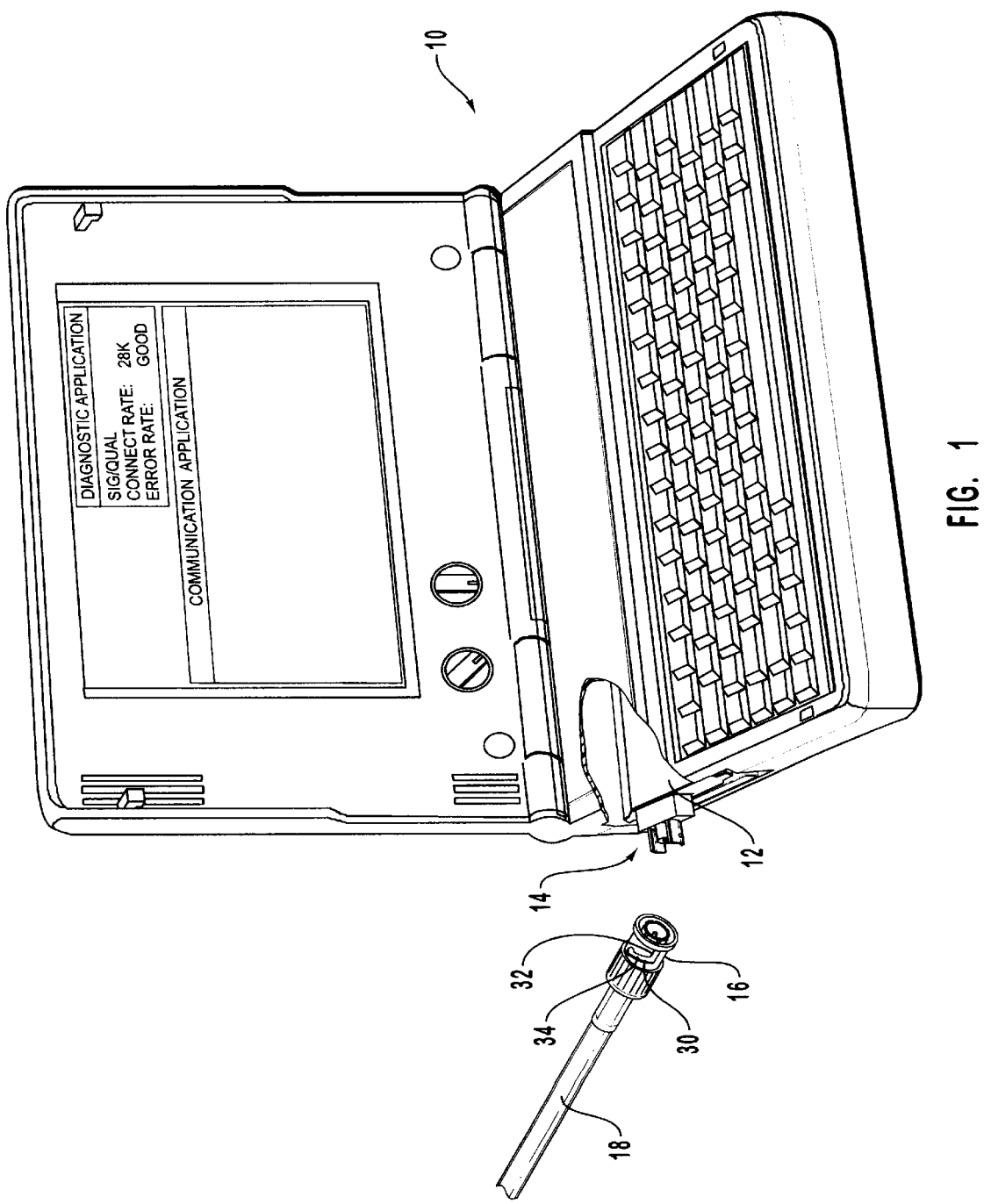
FIG. 1 is perspective view of a computer having a PC card with an inventive coaxial jack projecting therefrom.

Depicted in FIG. 1 is a computer 10 housing a PC card 12. The term "PC card," as used in the specification and appended claims, is broadly intended to include the various types of cards falling within the Personal Computer Memory Card International Association (PCMCIA) perimeters, communication cards falling outside of those standards, and cards which are developed under new standards. Examples of PC cards include modem cards, network cards, memory cards, SCSI cards, cellular phone cards, and combinations thereof. PC cards can have but are not limited to having a Type I, II, or III form factor.

A retractable coaxial jack 14, in a preferred embodiment of the present invention, is attached to the PC card 12. The coaxial jack 14 is configured to be physically and electrically coupled to a coaxial connector 16 attached to an end of a coaxial cable 18. As used in the specification and appended claims, the term "coaxial connector" is broadly intended to include all the various types of connectors used with coaxial cables. One example of a coaxial connector, as depicted in FIG. 1, is a bayonet connector or BNC. Other types of coaxial connectors include RCA connectors and F-type connectors. Coaxial connector 16 is mounted on a coaxial cable 18 but could equally be mounted on other conventional adapters designed for operation with a coaxial cable.

Figure 2:
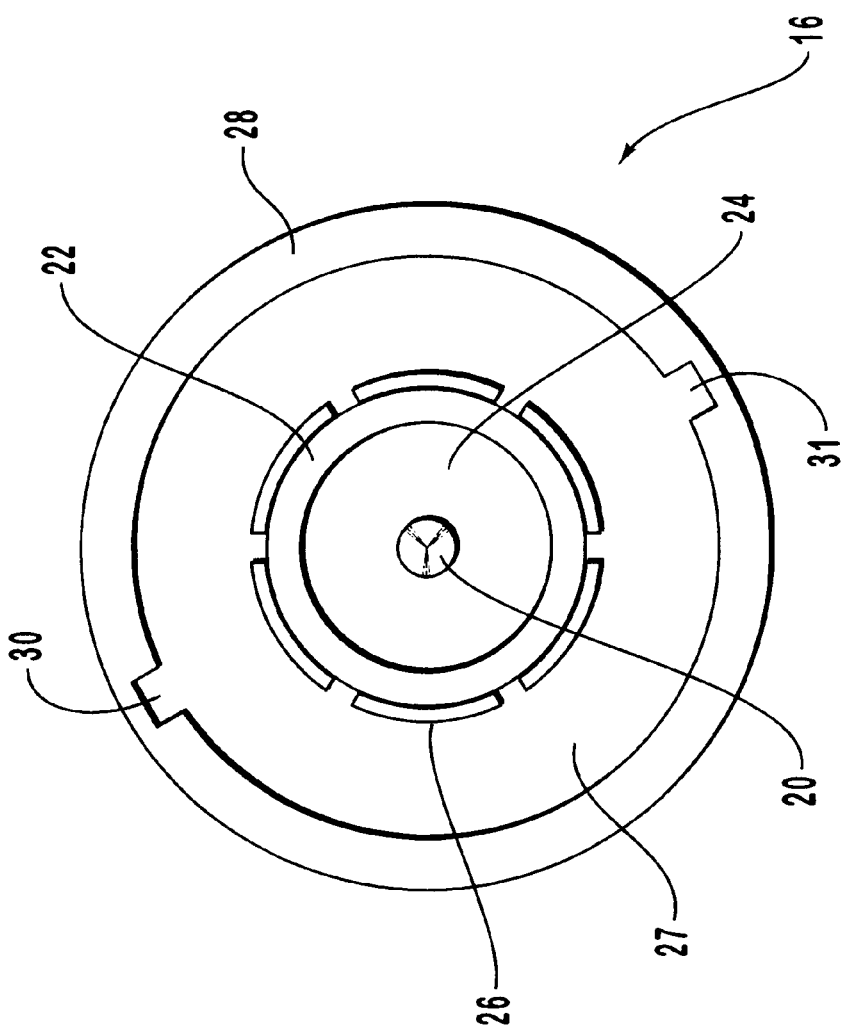
FIG. 2 is a front view of a coaxial connector shown in FIG. 1.

As depicted in FIGS. 1 and 2, coaxial connector 16 comprises a tubular insulator 22 bounding a substantially cylindrical chamber 24. Concentrically disposed within chamber 24 is a metal contact pin 20. Encircling the exterior of insulator 22 is a conductive sleeve 26. Rotatably encircling sleeve 26 is an annular collar 28. Conductive sleeve 26 and collar 28 bound an annular space 27 therebetween. Formed on opposing sides of collar 28 are a pair of slots 30 and 31. As depicted in FIG. 1, each slot 30 and 31 includes a first section 32 that is axially aligned with coaxial connector 16 and a second section 34 that curves to partially spiral around coaxial connector 16.

Figure 3:
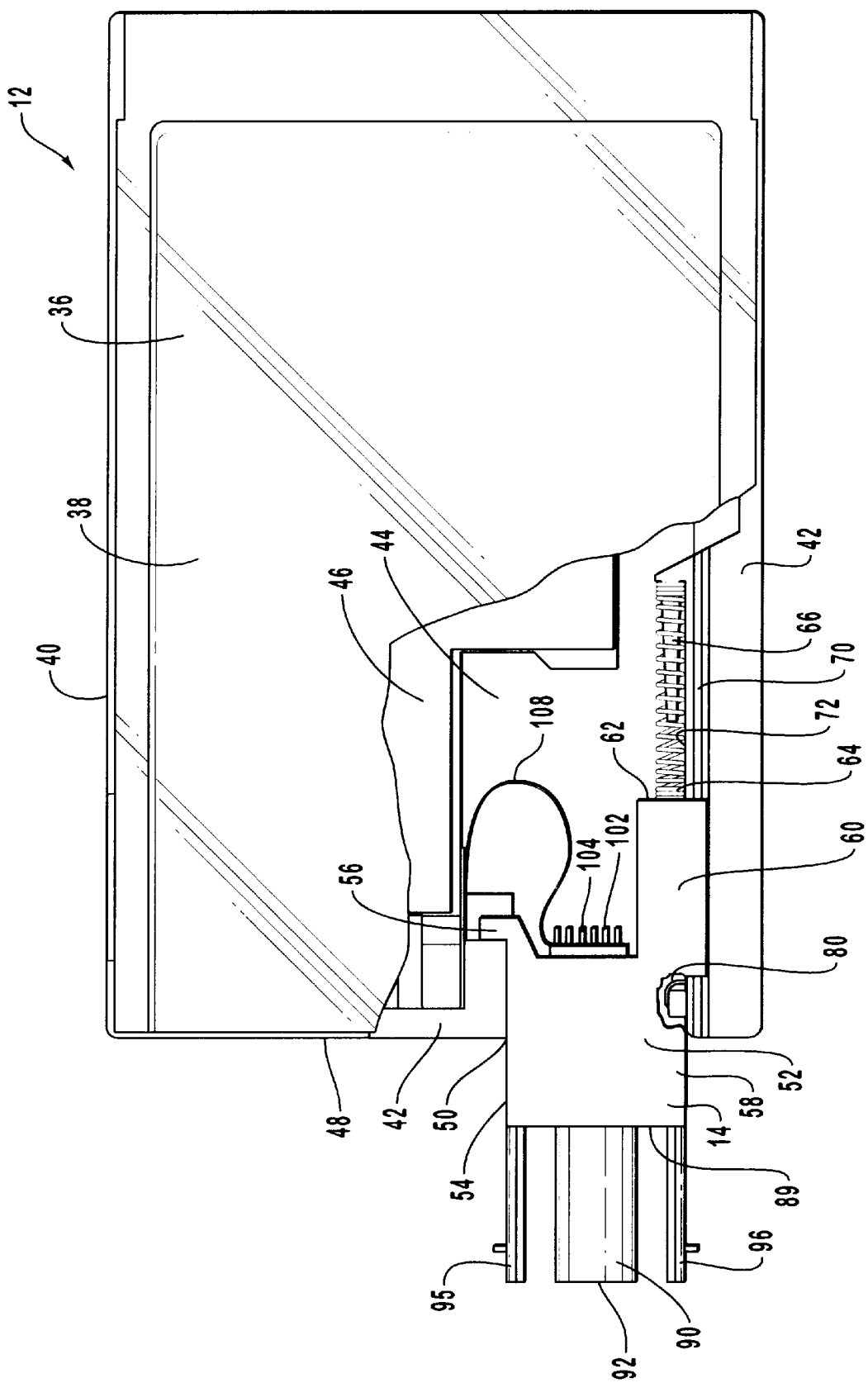
FIG. 3 is a partially cut away top view of the PC card shown in FIG. 1 with the inventive coaxial jack projecting therefrom.

Depicted in FIG. 3, PC card 12 comprises a housing 36 which includes a top cover plate 38 and an opposing bottom cover plate 40. A narrow boarder member 42 secures plates 38 and 40 together around the perimeter thereof. Cover plates 38 and 40 bound a compartment 44 therebetween in which a circuit board 46 is disposed. Formed at a front end 48 of PC card 12 is an opening 50. Opening 50 extends through boarder member 42 to communicate with compartment 44. Coaxial jack 14 is slidably positioned within compartment 44 so as to selectively move between an extended position and a retracted position. In the extended position, as shown in FIG. 3, a portion of coaxial jack 14 projects out of opening 50 for attachment with coaxial connector 16. When not in use, coaxial jack 14 can be selectively moved into the retracted position wherein coaxial jack 14 is substatially enclosed within compartment 44.

Figure 4:
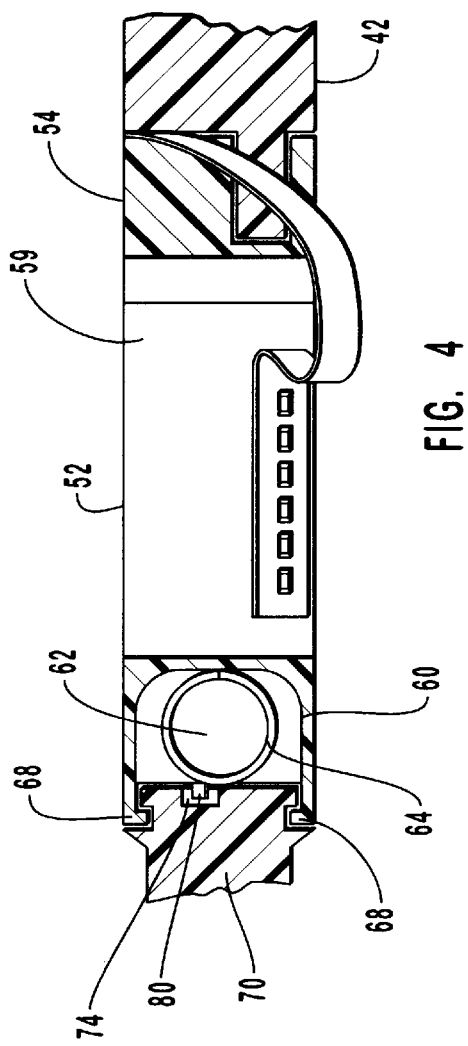
FIG. 4 is an elevated partially cross sectional back view of the coaxial jack shown in FIG. 3.

As depicted in FIGS. 3 and 4, the coaxial jack 14 comprises a base 52 having opposing sides 54 and 58 extending between a front face 89 and an opposing back face 59. The side 54 of the coaxial jack 14 slidably engages with a portion of the boarder member 42 and a stop 56 projects from the end of the jack. In one embodiment of the present invention, means are provided for biasing base 52 outward into the extended position. By way of example, a tubular tail 60 projects from the end of side 58. As depicted in FIGS. 3 and 4, tail 60 has an opening 62 configured to receive a spring 64. Tail 60 also includes a pair of inwardly facing finger 68 that slidably engage a rail 70 formed on boarder member 42. The opposing end of spring 64 is mounted on a post 66 projecting off of border member 42. In this configuration, spring 64 functions to bias base 52 outward into the extended position.

In alternative embodiments, it is envisioned that spring 64 can be placed at different locations to bias against base 52. Furthermore, spring 64 can be replaced with other conventional types of springs such as a leaf spring. Examples of alternative embodiments of the means for biasing base 52 outward are disclosed in U.S. Pat. No. 5,547,401, filed Aug. 16, 1994 (hereinafter "the '401 patent"), and U.S. patent application No. 08/976,819, filed Nov. 24, 1997 (hereinafter "the '819 application"), which are incorporated herein by specific reference.

Figure 5:
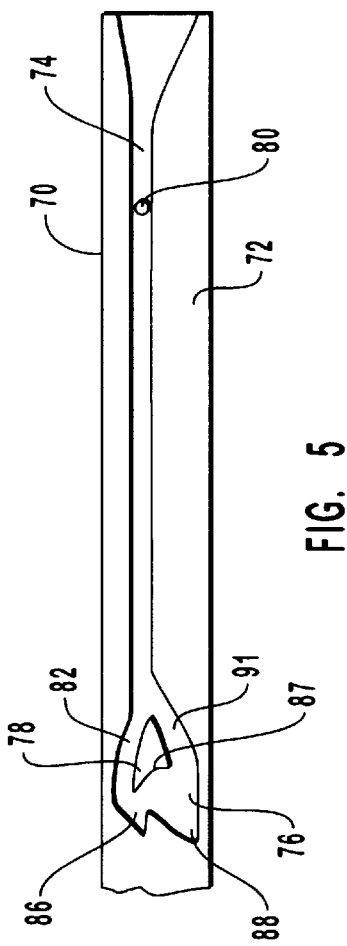
FIG. 5 is an elevated side view of a channel formed on the PC card shown in FIG. 3.

The present invention also includes means for selectively retaining base 52 in the retracted position. By way of example and not by limitation, depicted in FIGS. 3, 4, and 5, rail 70 has a front face 72 with a channel 74 recessed therein. A substantially heart-shaped grove 76 having a substantially heart-shaped guide 78 disposed in the center thereof is formed at the end of channel 74. A flexible pin 80 projects from base 52 into channel 74. As base 52 is manually retracted or pushed within compartment 44, pin 80 travels along channel 74 into grove 76. As a result of channel 74 being slightly offset above guide 78, pin 80 travels in an upper side channel 82 which curves around to a first alcove 86. Alcove 86 stops the progression of pin 80 and thus base 52. As base 52 is manually released, spring 64 produces a biasing outward force on base 52 causing pin 80 to move into a saddle 87 formed on guide 78. The contact between pin 80 and saddle 87 prevents base 52, which is continually urged by spring 64, from automatically advancing out into the extended position.

To move base 52 back into the extended position, base 52 is manually pushed slightly into compartment 44. The configuration of grove 76 causes pin 80 to move into an outwardly curving second alcove 88. As base 52 is manually released, pin 80 slides down a lower side channel 91 back into main channel 74, thereby allowing base 52 to freely slide outward into the extended position. The above process can be repeated to selectively move base 52 between the retracted and extended position. Alternative embodiments of the means for selectively retaining are disclosed in the '401 patent and '819 application which were previously incorporated herein by specific reference.

Figure 6:
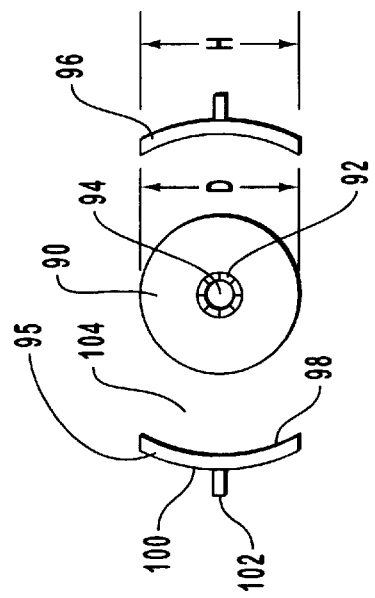
FIG. 6 is an elevated front view of the coaxial jack shown in FIG. 3.

The present invention also includes means projecting from base 52 for physically and electrically coupling with coaxial connector 16 when base 52 is in the extended position. By way of example and not by limitation, as depicted in FIGS. 3 and 6, projecting from a front face 89 of base 52 is a tubular insulator 90 made from a dielectric material. Insulator 90 encircles a conductive socket 92. Socket 92 bounds an opening 94 configured to receive contact pin 20 of coaxial connector 16 in electrical contact. Also projecting from face 89 on opposing sides of insulator 90 is a conductive first retention arm 95 and a conductive second retention arm 96. In an alternative embodiment, only one of retention arms 95 and 96 needs to be conductive. Each retention arm 95 and 96 has a curved inside face 98 and an opposing curved outside face 100. Each outside face 100 has a knob 102 projecting therefrom. Retention arms 95 and 96 are spaced from tubular insulator 90 so that a gap 104 is formed therebetween. Furthermore, each of retention arms 95 and 96 have a height H which in one embodiment does not exceed the thickness of PC card 12 and more preferably does not exceed the thickness of base 52.

As depicted in FIG. 3, conductive socket 92 is in electrical communication with a conductive line wire 102 extending through base 52. Similarly, at least one of the conductive retention arms 95 and 96 are in electrical communication with a conductive line wire 104 also extending through base 52. A flexible wire ribbon 108 electrically connects line wires 102 and 104 with circuitry located on circuit board 46.

To effect coupling of coaxial connector 16 with coaxial jack 14, coaxial connector 16 is slid onto coaxial jack 14 such that: contact pin 20 is received within opening 94 of socket 92; retention arms 95, 96 are received within annular space 27 formed between conductive sleeve 26 and collar 28; and knobs 102 are received within opposing slots 30,31 on collar 28. In this configuration, collar 30 is rotated a quarter turn, thereby locking coaxial connector 16 on coaxial jack 14.

The above described embodiment of the present invention is only one example thereof. The present invention also envisions that inventive coaxial jack 14 can have a variety of different configurations. For example, base 52 need not have the substantially box shaped configuration as depicted in the above example. Rather, base 52 need only have the necessary structural elements to provide its function of supporting the other elements. In this regard, base 52 may be integrally formed with retention arms 95 and 96. Likewise, retention arms 95 and 96 can be separated or integrally bound together at the base of each arm and yet still be considered discrete arms.

Figure 8:
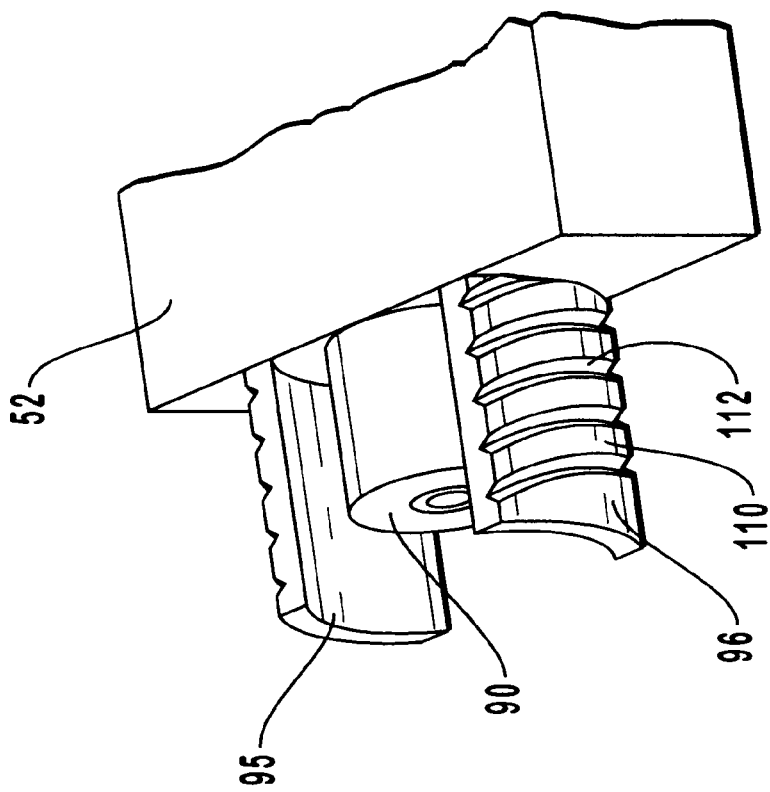
FIG. 8 is a perspective view of another alternative embodiment of the media jack shown in FIG. 3.
Figure 7:
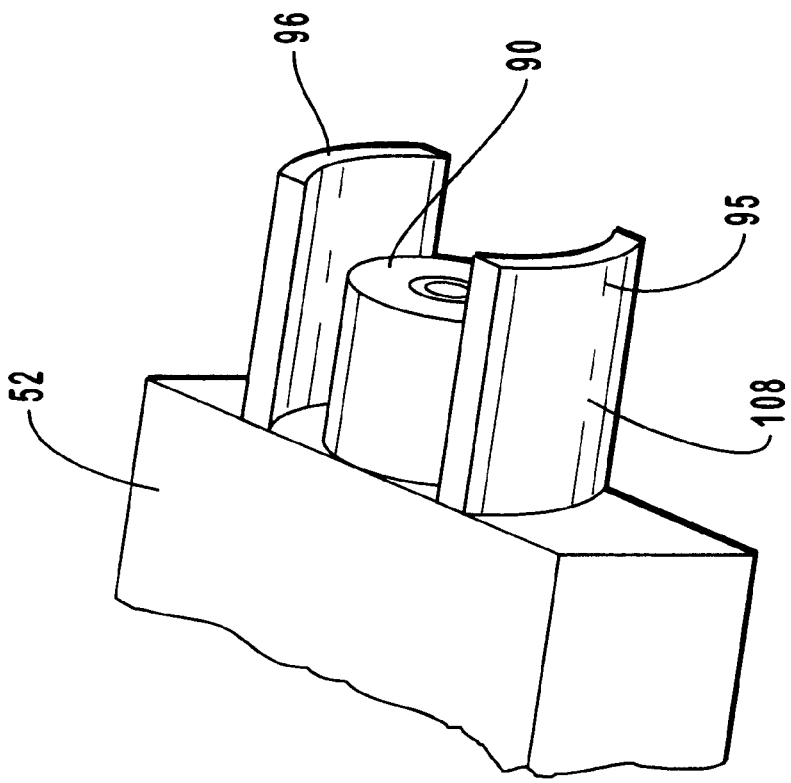
FIG. 7 is a perspective view of an alternative embodiment of the media jack shown in FIG. 3.

Retention arms 95 and 96 can also be configured to couple with a variety of different types of coaxial connectors. By way of example and not by limitation, as depicted in FIG. 7, retention arms 95 and 96 can be formed with a smooth outside face 108. In yet another embodiment, as depicted in FIG. 8, retention arms 95 and 96 can each be formed with a curved outside face 110 having screw threads 112 formed thereon. It is also envisioned that insulator 90 need not have a circular exterior surface. Rather in one embodiment, it may be necessary to flatten the top and bottom of insulator 90 so as to fit on a desired PC card.

Figure 9:
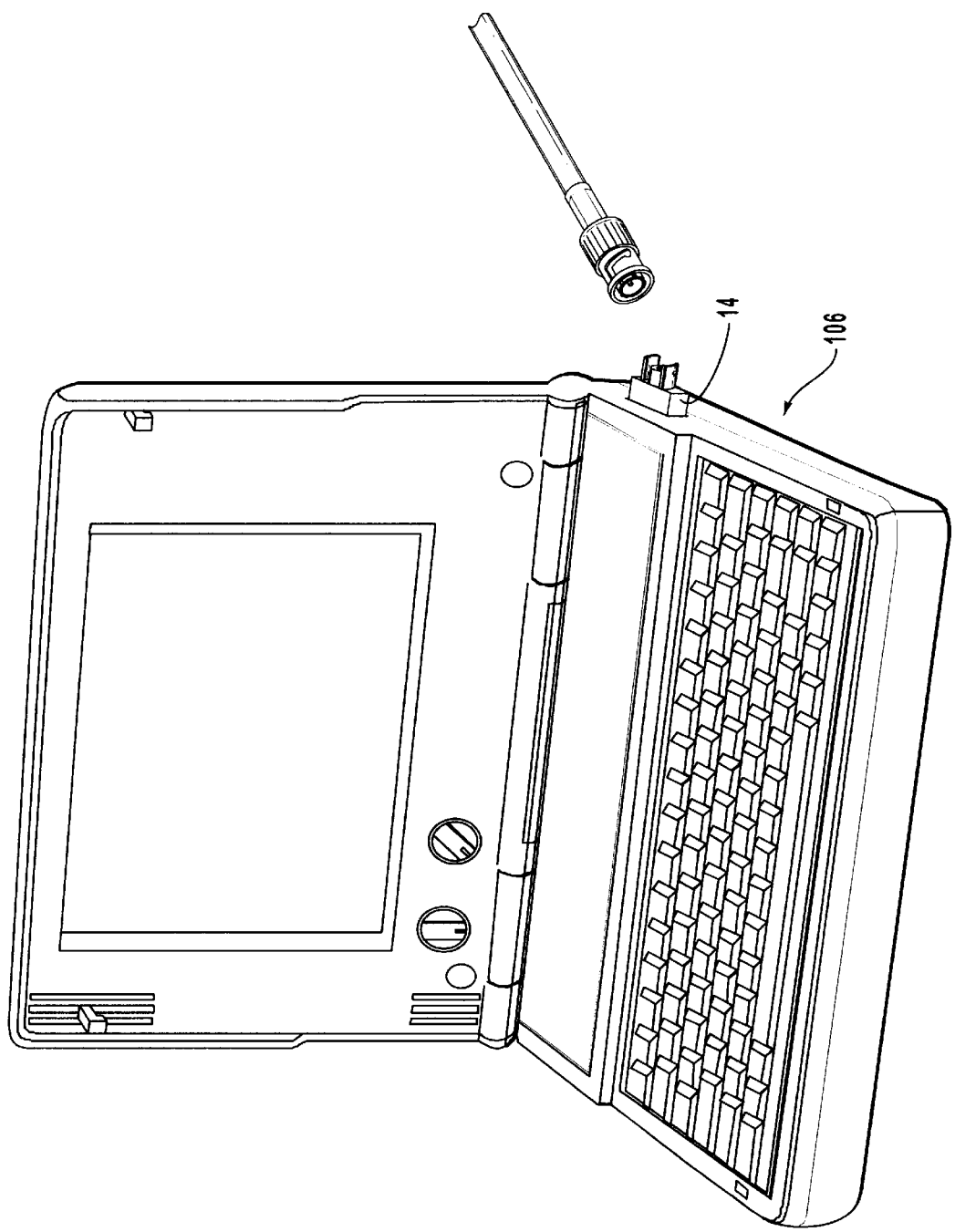
FIG. 9 is a perspective view of the inventive coaxial jack directly mounted onto a laptop computer.

Furthermore, the present invention envisions that the inventive coaxial jack need not be incorporated onto a PC card. Rather, the inventive coaxial jack can be incorporated directly onto an electrical apparatus such as a laptop computer, PIM, cellular telephone, television, stereo, or other electrical apparatus containing a CPU. For example, depicted in FIG. 9, inventive coaxial jack 14 is mounted directly onto a laptop computer 106 without the use of a PC card. Examples of how jacks can be directly mounted to electrical apparatus are disclosed in the '819 application which was previously incorporated herein by specific reference.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A coaxial jack for connecting a coaxial cable to a PC type communications card, the PC type communications card having a thickness and containing a circuit board, the coaxial jack comprising:

a base with a front face, the base including a thickness that does not generally exceed the thickness of the PC type communications card;

a tubular insulator projecting from the front face of the base;

a conductive socket disposed within the tubular insulator, the conductive socket including an opening sized and configured to be electrically connected to a contact pin of a coaxial connector;

a first outwardly extending arm projecting from the front face of the base and spaced from the tubular insulator to form a first gap, the first arm having a height that does not generally exceed the thickness of the base;

a second outwardly extending arm projecting from the front face of the base and spaced from the tubular insulator to form a second gap, the second arm having a height that does not generally exceed the thickness of the base;

a first conductive line wire extending through the base and in electrical communication with the conductive socket;

a second conductive line wire extending through the base and in electrical communication with at least the first outwardly extending arm or the second outwardly extending arm; and a flexible wire ribbon electrically connecting the first conductive line wire and the second conductive line wire to the circuit board contained within the PC type communications card;

wherein the first outwardly extending arm, second outwardly extending arm, tubular insulator and conductive socket being sized and configured to be coupled to a coaxial connector.

2. The coaxial jack as recited in claim 1, further comprising a curved inner face of the first arm and a curved inner face of the second arm.

3. The coaxial jack as recited in claim 1, further comprising a curved outer face of the first arm and a curved outer face of the second arm.

4. The coaxial jack as recited in claim 3, further comprising a first knob projecting outwardly from the curved outer face of the first arm and a second knob projecting outwardly from the curved outer face of the second arm.

5. The coaxial jack as recited in claim 3, further comprising a first set of threads on the curved outer face of the first arm and a second set of threads on the curved outer face of the second arm.

6. A PC type communications card configured for coupling with a coaxial connector, the communications card comprising:

a housing including a top cover, a bottom cover and a boarder member that connects the top cover to the bottom cover;

a circuit board disposed within a compartment formed by the housing;

a coaxial jack slidably positioned within the compartment, the coaxial jack including:

a base with a front face, the base including a thickness that does not generally exceed a thickness of the PC type communications card;

a tubular insulator projecting from the front face of the base;

a conductive socket disposed within the tubular insulator, the conductive socket including an opening sized and configured to be electrically connected to a contact pin of a coaxial connector;

a first outwardly extending arm projecting from the front face of the base and spaced from the tubular insulator to form a first gap, the first arm having a height that does not generally exceed the thickness of the base;

a second outwardly extending arm projecting from the front face of the base and spaced from the tubular insulator to form a second gap, the second arm having a height that does not generally exceed the thickness of the base;

a first conductive line wire extending through the base and in electrical communication with the conductive socket; and a flexible wire ribbon electrically connecting the first conductive line wire to the circuit board;

wherein the first outwardly extending arm, second outwardly extending arm, tubular insulator and conductive socket are sized and configured to be engaged to a coaxial connector.

7. The communications card as recited in claim 6, further comprising a second conductive line wire extending through the base and in electrical communication with the first outwardly projecting arm and the second outwardly projecting arm.

8. The communications card as recited in claim 7, wherein the flexible wire ribbon electrically connects the first conductive line wire and the second conductive line wire to the circuit board.

9. The communications card as recited in claim 6, further comprising a second conductive line wire extending through the base and in electrical communication with at least the first outwardly projecting arm or the second outwardly projecting arm.

10. The communications card as recited in claim 7, wherein the flexible wire ribbon electrically connects the first conductive line wire and the second conductive line wire to the circuit board.

11. The communications card as recited in claim 6, further comprising a curved inner face of the first arm and a curved inner face of the second arm.

12. The communications card as recited in claim 6, further comprising a curved outer face of the first arm and a curved inner face of the second arm.

13. The communications card as recited in claim 12, further comprising a first knob projecting outwardly from the curved outer face of the first arm and a second knob projecting outwardly from the curved outer face of the second arm.

14. The coaxial jack as recited in claim 12, further comprising a first set of threads on the curved outer face of the first arm and a second set of threads projecting outwardly from the curved outer face of the second arm.

15. A retractable coaxial jack for coupling a coaxial connector to an electronic device, the coaxial jack comprising:

a base including a front face and a thickness;

a tubular insulator projecting from the front face of the base, the tubular insulator including a diameter that is generally equal to the thickness of the base;

a conductive socket disposed within the tubular insulator, the conductive socket including an opening sized and configured to be electrically connected to a contact pin of a coaxial connector;

a first outwardly extending arm projecting from the front face of the base and having a height generally equal to the diameter of the tubular insulator;

a second outwardly extending arm projecting from the front face of the base and having a height generally equal to the diameter of the tubular insulator;

a first conductive line wire in electrical communication with the conductive socket; and a flexible wire ribbon electrically connecting the first conductive line wire to the electronic device;

wherein the first outwardly extending arm, second outwardly extending arm, tubular insulator and conductive socket are sized and configured to be engaged to a coaxial connector.

16. The coaxial jack as recited in claim 15, further comprising a second conductive wire in electrical communication with at least the first outwardly extending arm or the second outwardly extending arm.

17. The coaxial jack as recited in claim 16, wherein the flexible wire ribbon electrically connects the second conductive wire to the electronic device.

18. The coaxial jack as recited in claim 15, further comprising a second conductive wire in electrical communication with the first outwardly extending arm and the second outwardly extending arm.

19. The coaxial jack as recited in claim 16, wherein the flexible wire ribbon electrically connects the second conductive wire to the electronic device.

20. The communications card as recited in claim 16, further comprising a first curved inner face of the first arm and a second curved inner face of the second arm.

21. The communications card as recited in claim 16, further comprising a first curved outer face of the first arm and a second curved inner face of the second arm.

22. The communications card as recited in claim 21, further comprising a first knob projecting outwardly from the first curved outer face of the first arm and a second knob projecting outwardly from the second curved outer face of the second arm.

* * * * *